United States Patent [19]
Yoneda et al.

[11] Patent Number: 5,654,506
[45] Date of Patent: Aug. 5, 1997

[54] HEAT TYPE AIR FLOW METER

[75] Inventors: Hiroshi Yoneda; Masuo Akamatsu, both of Hitachinaka, Japan

[73] Assignees: Hitachi, Ltd.; Hitachi Automotive Engineering Co., Ltd., both of Japan

[21] Appl. No.: 487,534

[22] Filed: Jun. 7, 1995

[30] Foreign Application Priority Data

Jun. 10, 1994 [JP] Japan ................... 6-128789

[51] Int. Cl.⁶ ...................................... G01F 1/68
[52] U.S. Cl. ................ 73/204.11; 73/118.2; 73/202.5
[58] Field of Search ........................ 73/204.15, 204.11, 73/204.16, 204.23, 202.5, 118.2

[56] References Cited

U.S. PATENT DOCUMENTS

| | | | |
|---|---|---|---|
| 4,515,014 | 5/1985 | Sumal | 73/202.5 |
| 4,523,462 | 6/1985 | Kolodjski | 73/204.15 |
| 4,548,075 | 10/1985 | Mariano | 73/202.5 |
| 5,074,147 | 12/1991 | Sarma | 73/204.15 |
| 5,263,369 | 11/1993 | Cutler | 73/204.15 |
| 5,417,110 | 5/1995 | Wood | 73/204.15 |
| 5,460,040 | 10/1995 | Tada et al. | 73/204.15 |
| 5,493,906 | 2/1996 | Sen-Zhi | 73/204.15 |
| 5,509,306 | 4/1996 | Yamamoto et al. | 73/204.15 |

FOREIGN PATENT DOCUMENTS

| | | | |
|---|---|---|---|
| 0162432 | 11/1985 | European Pat. Off. | 73/202.5 |
| 2-124429 | 5/1990 | Japan . | |

OTHER PUBLICATIONS

McGraw–Hill Encyclopedia of Science and Technology, pp. 287–290B (1977).

*Primary Examiner*—George M. Dombroske
*Attorney, Agent, or Firm*—Evenson, McKeown, Edwards & Lenahan, P.L.L.C.

[57] ABSTRACT

A heat type air flow meter with improved resistance to radio wave interference by restraining a high frequency noise from a resistor and the supporting materials thereof provided in air passage. At least one high frequency band cut-off filter having a capacitor and a inductor is provided between, on one hand, a heating resistor and a heat sensitive resistor and, on the other hand, a temperature control circuit, and an intermediate connecting point of one end of the capacitor connected with one end of the inductor is also connected to both resistors. Thereby, as the resistivity to the radio wave interference is effectively improved cost reduction and compactness of the flow meter can be achieved.

7 Claims, 3 Drawing Sheets

HEAT TYPE AIR FLOW METER

BACKGROUND OF THE INVENTION

The present invention relates to a heat type air flow meter, especially relates to a heat type air flow meter which is improved so as to suppress radio wave interference.

As an improved method for suppressing radio wave interference in a heat type air flow meter, a high frequency band cut-off filter is provided between both bodies of a heating resistance body and a heat sensitive resistance body and the temperature control circuit as described in Japanese Patent Application Laid-open 2-124429(1990).

The cause of a malfunction of the heat type air flow meter under high frequency and strong electric field is the high frequency electric current induced in the both resistances of the heat generation resistance and heat sensitive resistance, and as both resistance elements are covered on metal body having shield effect generally, even the method mentioned in the Japanese Patent Laid-Open issue 2-124429 was not able to fully suppress the radio wave interference.

The air passage body is today made of resin, however, and therefore the above-mentioned method cannot be used. Then, as high frequency band cut-off filter is generally used, the high frequency noise which is induced in both resistance bodies invades the control circuit with high frequency band cut-off filter mentioned above is taken in.

Furthermore, the high frequency band cut-off filter mentioned above is provided on a signal ground. Consequently, there is a danger that the high frequency noise acts on a common mode of the control circuit and causes false movements.

SUMMARY OF THE INVENTION

In the present invention, an LC circuit constituting a high frequency band cut-off filter is connected to a base ground separated from the signal ground to prevent the high frequency noise invading the control circuit.

An object of the present invention is to remove and restrain the high frequency noise transmitted from the resistance bodies and a support members provided in an air passage and thereby to provide a heat type air flow meter having improved resistivity to the radio wave interference.

In the heat type air flow meter having the heat resistance body and a heat sensitive body provided in the air passage, and the temperature control circuit for controlling the temperature generated in the heat resistance body mentioned, at least a high frequency band cut-off filter constructed with a capacitor and a inductor between the temperature control circuit and both resistance bodies of the heat sensitive resistor and the heat generation resistance is provided. In the high frequency band cut-off filter, the intermediate connection point at which one end of the capacitor is connected to one end of the inductor is connected to a side of both resistance bodies, and the other end of the inductor is connected to the temperature control circuit side.

When an air passage consists of an electrically nonconductive material according to the present invention, a high frequency noise is induced in the resistance bodies and the supporting materials provided in the air passage under a condition of high frequency and strong electric field.

However, the high frequency band cut-off filter (herein after called the LC filter) raises the impedance in the control circuit side, and the high frequency noise escapes to the base ground. At this time, if the base ground is separated from the signal ground, the high frequency noise does not affect the signal ground in the common mode. Further, as a T-type filter is formed with the inductor having the resistance body and the LC filter, the influence given to the temperature control circuit by the noise can be restrained, with the noise otherwise invading a power supply, the signal ground and an output terminal of the temperature control circuit through an input and output harness is effectively restrained.

DETAILED DESCRIPTION OF THE PREFERRED EMBODIMENTS

Figure 1:
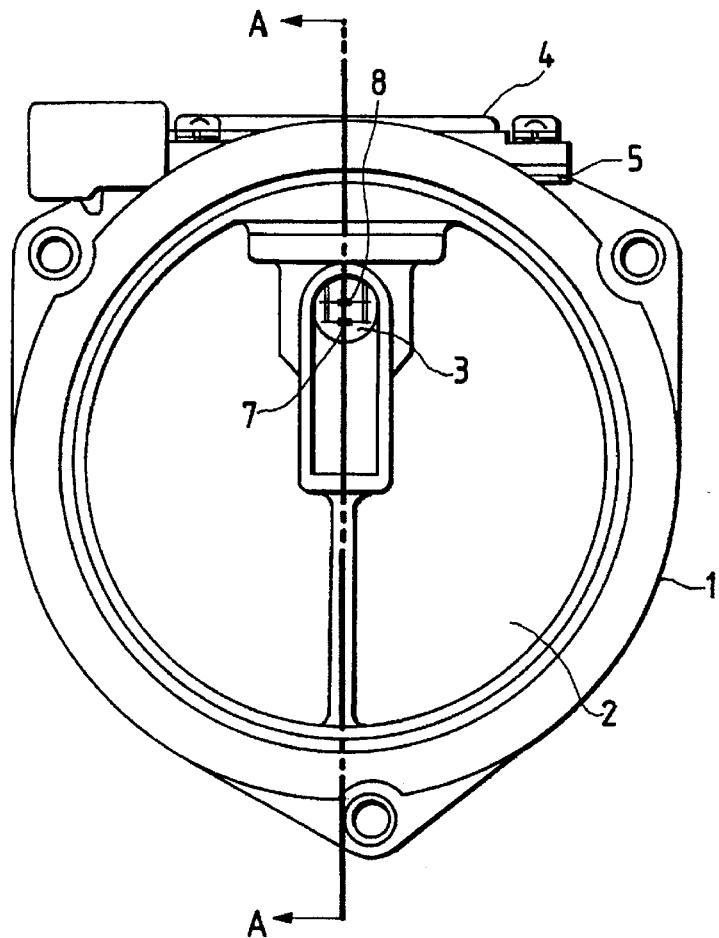
FIG. 1 is a front view of a heat type air flow meter showing an embodiment of the present invention.

In FIG. 1, a heating resistance body 7 as a sensor for measuring air flow quantity and a heat sensitive resistor 8 are provided in a bypass passage 3 in a main air passage 2. A sensor module 4 containing a temperature control circuit 9 (FIG. 3 or FIG. 4) and a metal body 5 acting as base ground separate from a signal ground are installed on an outside wall of body 1 forming the main air passage 2.

Figure 2:
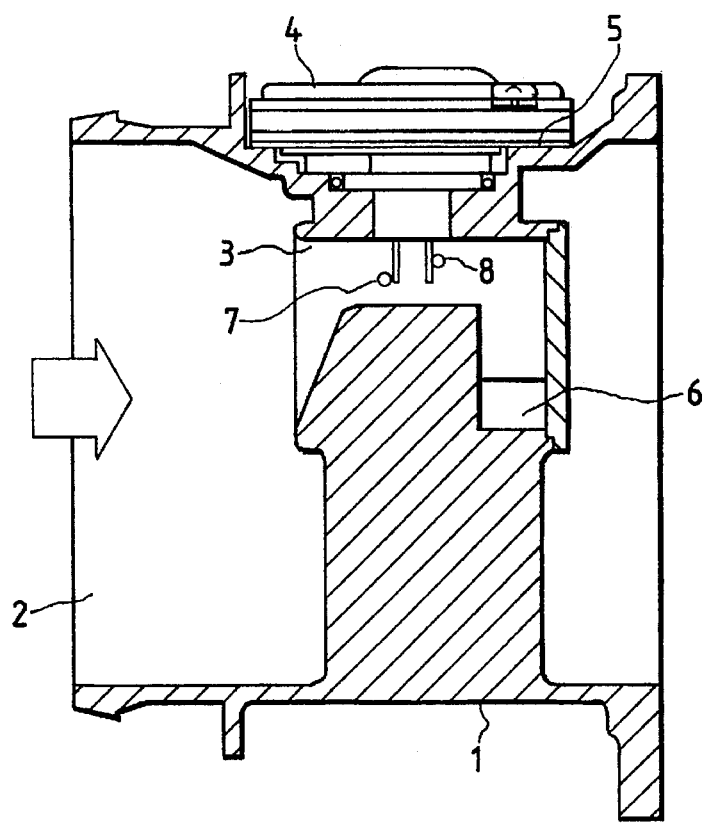
FIG. 2 is cross section along line AA of FIG. 1.

After a portion of air flow which flows in the direction shown by the broad arrow in FIG. 2 is flowed into the bypass passage 3, that portion joins in a main air flow from a opening portion 6 on the side of the passage 3 to reduce backfire.

Figure 3:
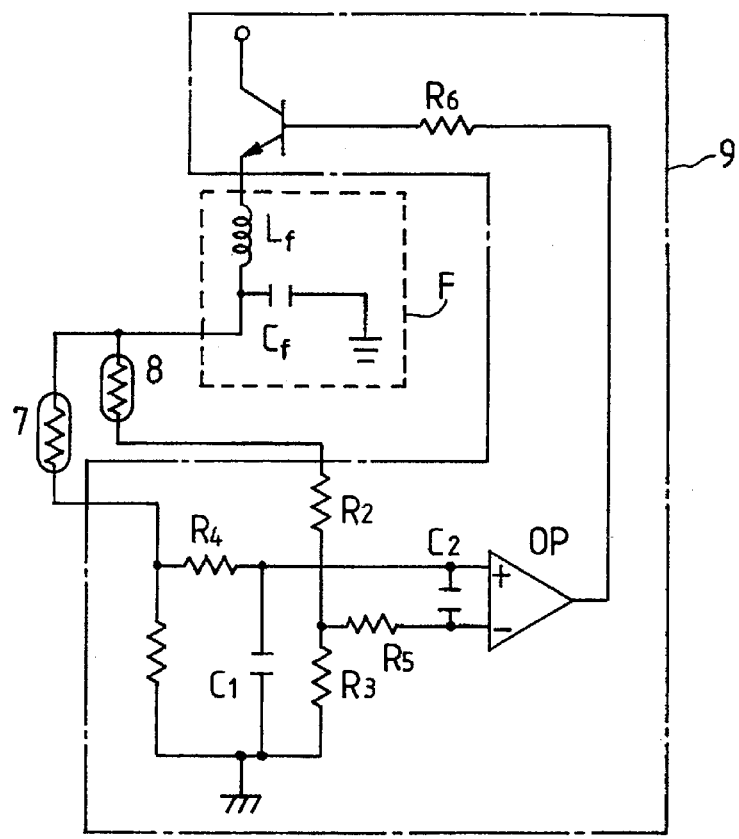
FIG. 3 is a schematic diagram of an embodiment of the temperature control circuit in the sensor module shown in FIG. 1.

One embodiment of the temperature control circuit 9 prepared for the sensor module 4 of FIG. 1 is shown in FIG. 3. Heating resistor 7 and heat sensitive resistor 8 are provided in bypass passage 3 in the main air passage 2 as described above. Resistances R1, R2, R3 and the resistance bodies 7,8 mentioned above form a bridge circuit, and a temperature difference between a temperature of the heating resistor 7 and the heat sensitive resistor 8 is controlled so as to keep within a constant value by an operational amplifier OP. Thereby, the electric current which flows through the heating resistor 7 is controlled as a function of the air flow quantity which is thereby accurately measured.

Capacitors C1, C2 are provided as a general noise protection technique for the control circuit. Filter F is inserted in a portion of the circuit supplying an electric current controlled by the operational amplifier OP in both resistance bodies 7,8.

The intermediate connection point of one side of the capacitor Cf and one side of the inductor Lf is also connected to both resistance bodies 7,8, and other side of the inductor Lf is connected to the temperature control circuit 9. The other side of the capacitor Cf connects to a metal body 5 acts as the base ground (and herein after called the base ground) which is separated from the signal ground.

If the above-described heat type air flow meter were placed in a strong, high frequency electrical field, a harmful high frequency noise would be induced in the control movements to the supporting materials connecting both resistors 7,8 with the temperature control circuit 9.

However, the capacitor Cf of the filter F bypasses the high frequency noise to the base ground and the inductor Lf acts as a function for restraining the high frequency noise.

In the circuit configuration shown in FIG. 3 in particular, the resistivity to the radio wave interference is improved to a level where there is no practical problem prevent insertion of the LC filter in only the one portion of the circuit.

Moreover, the filter F forms a T-type filter with the inductance included in the both resistors 7,8 in a circuit thereof.

As a result, the influence of the noise invading through a input and output harness of the heat type air flow meter into the power supply, the signal ground, the output terminal of the temperature control circuit 9 gives to temperature control circuit 9 can be restrained.

Figure 4:
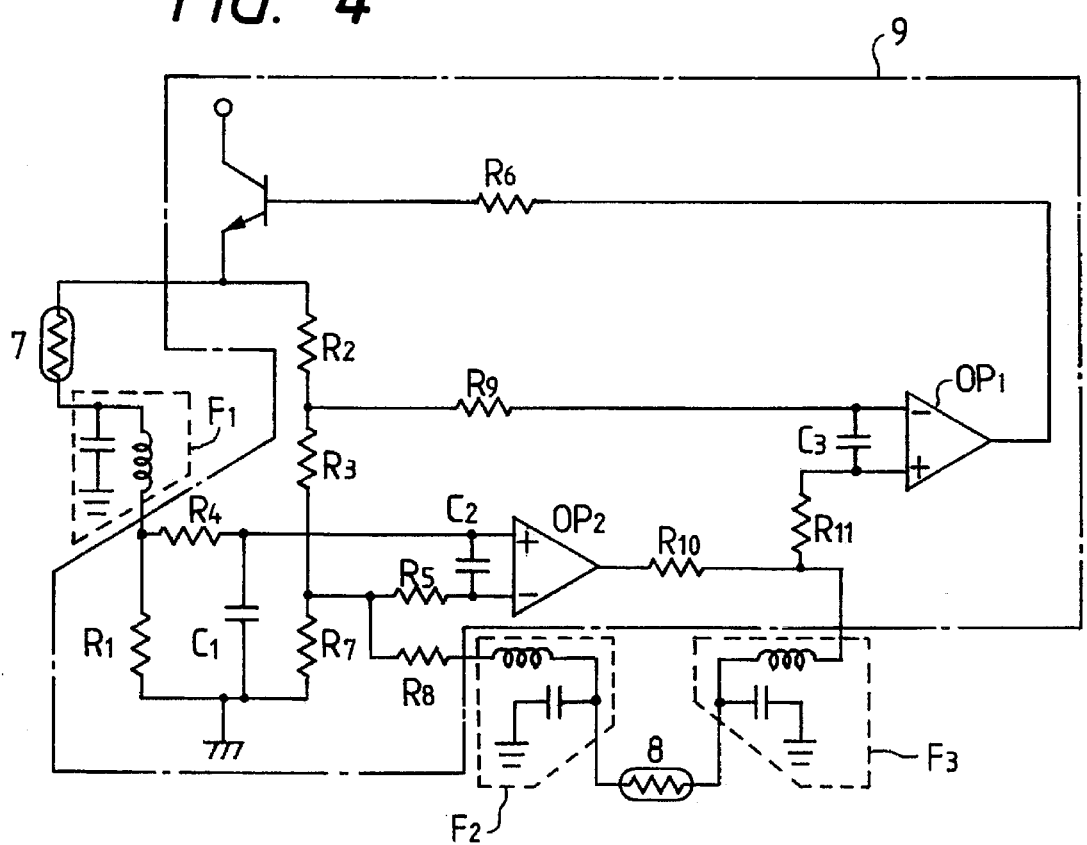
FIG. 4 is a schematic diagram showing another embodiment of the temperature control circuit.
Figure 5:
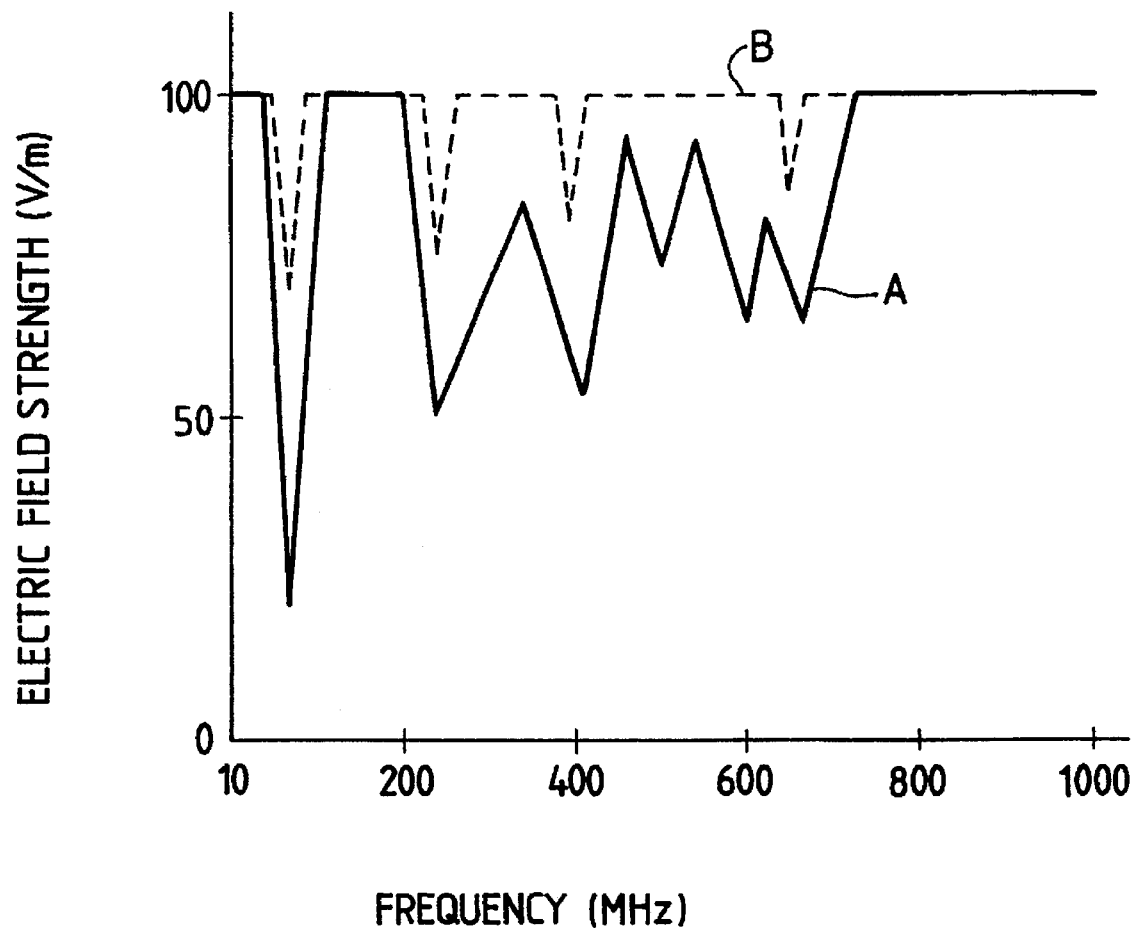
FIG. 5 is a graph illustrating an evaluation between the resistivity to the radio wave interference.

In the operational amplifier OP2 of the embodiment shown in FIG. 4, the heat sensitive resistor 8 and resistors R7, R8 form a non-reverse amplifier, with the use of a lowered resistance of the heat sensitive resistor 8 the same as the heating resistor 7. The heating resistor 7 and the resistors R1, R2, R3 and the non-reverse amplifier have a movement condition the same as that of the bridge circuit. On this account, the heating resistor 7 is controlled so as to keep the temperature difference with the heat sensitive resistor 8 within a predetermined value by the operational amplifier OP1. Therefore, the electric current which flows through the heating resistor 7 is controlled as a function of the air flow quantity which is thus accurately detected. The capacitors C1, C2, C3 provide general noise prevention in the control circuit. Filter F1 is inserted in the portion where a signal returns from the heat resistor 7 to the temperature control circuit 9. Filters F2, F3 are inserted at both ends of the heat sensitive resistor 8.

Furthermore, the construction of each filter is similar to the filter in FIG. 3. The intermediate connection point of one end of each capacitor and one end of each inductor is connected to both resistors, and other side of each inductor is connected to the temperature control circuit 9. The other side of each capacitor is contacted the base ground separate from the signal ground.

According to the above described construction, the heat type air flow meter placed in the strong, high frequency electric field has high frequency noise induced in the heating resistor 7, the heat sensitive resistor 8 and the supporting materials.

The capacitor in the each filter bypasses the induced high frequency noise into the base ground, and the inductor restrains the high frequency noise.

Particularly according to this embodiment, resistance to radio wave interference is improved to a level where there is not any problem in practical use by inserting the LC filter in the three positions.

Further, depending upon the environment of use only the filters F1, F2 or F1, F3 or in some cases only filter F3 may be necessary to restrain radio wave interference.

We claim:

1. A heat type air flow meter having an air passage and a metal body acting as base ground, comprising a heating resistor and a heat sensitive resistor operatively arranged in the air passage, and a temperature control circuit for controlling the heating resistor, said circuit having at least one high frequency band cut-off filter comprising a capacitor and an inductor between, on one hand, the heating resistor and the heat sensitive resistor and, on the other hand, the temperature control circuit, wherein an intermediate connection point where one end of the capacitor is connected to one end of the inductor is connected to both resistors and another end of the inductor is connected to the temperature control circuit and another end of the capacitor is connected to the metal body separate from a signal ground.

2. A heat type air flow meter as defined in claim 1, wherein said high frequency band cut-off filter is provided in a portion of said circuit which supplies an electric current to the resistors.

3. A heat type air flow meter as defined in claim 1, wherein said high frequency band cut-off filter is provided between the heat sensitive resistor and the temperature control circuit.

4. A heat type air flow meter as defined in claim 1, wherein said high frequency band cut-off filter is provided in a portion fed back to the temperature control circuit from the heat sensitive resistor.

5. A heat type air flow meter as defined in claim 1, wherein said high frequency band cut-off filter is connected between the heating resistor and the temperature control circuit and between the heat sensitive resistor and the temperature control circuit.

6. A heat type air flow meter as defined in claim 1, wherein said high frequency band cut-off filter is connected to between the heat sensitive resistor and the temperature control circuit.

7. A heat type air flow meter as defined in claim 1, wherein said high frequency band cut-off filter comprises the inductor and the capacitor and is connected to a metal body as a base ground so as to comprise a sensor module installed in a body forming a main air passage.

* * * * *